(12) United States Patent
Tokita et al.

(10) Patent No.: US 6,746,980 B2
(45) Date of Patent: Jun. 8, 2004

(54) DIELECTRIC CERAMIC COMPOSITION AND MULTILAYER CERAMIC CAPACITOR USED THE SAME

(75) Inventors: Kouji Tokita, Chigasaki (JP); Hideki Sakai, Chigasaki (JP); Shuuji Aisawa, Shiso-gun (JP); Tadahiko Horiguchi, Shiso-gun (JP)

(73) Assignees: Toho Titanium Co., Ltd., Kanagawa (JP); Tokin Ceramics Corporation, Hyogo (JP)

( * ) Notice: Subject to any disclaimer, the term of this patent is extended or adjusted under 35 U.S.C. 154(b) by 221 days.

(21) Appl. No.: 10/013,499

(22) Filed: Dec. 13, 2001

(65) Prior Publication Data

US 2002/0137622 A1 Sep. 26, 2002

(30) Foreign Application Priority Data

Dec. 15, 2000 (JP) ..................... P2000-381865

(51) Int. Cl.$^7$ ............................. C04B 35/468
(52) U.S. Cl. .................. 501/137; 501/138; 501/139
(58) Field of Search ................ 501/137, 138, 501/139

(56) References Cited

U.S. PATENT DOCUMENTS

| | | | | |
|---|---|---|---|---|
| 5,668,694 A | * | 9/1997 | Sato et al. | 361/321.4 |
| 6,344,427 B1 | * | 2/2002 | Komatsu et al. | 501/138 |
| 6,346,497 B1 | * | 2/2002 | Nakamura et al. | 501/138 |
| 6,524,983 B2 | * | 2/2003 | Kawamoto et al. | 501/138 |
| 6,556,422 B2 | * | 4/2003 | Kim et al. | 361/321.2 |
| 6,559,084 B1 | * | 5/2003 | Fujikawa et al. | 501/139 |

FOREIGN PATENT DOCUMENTS

| | | | |
|---|---|---|---|
| EP | 0992469 | | 4/2000 |
| JP | 2000026160 | * | 1/2000 |
| JP | 2000154055 | * | 6/2000 |

OTHER PUBLICATIONS

Patent Abstracts of Japan, Publication No. 10–139538, published May 1998, "Dielectric Porcelain Composition".
Patent Abstracts of Japan, Publication No. 08–124785, published May 1996, "Multilayered Ceramic Chip Capacitor".
Patent Abstracts of Japan, Publication No. 2000–103668, published Apr. 2000, "Dielectric Ceramic Composition And Laminated Ceramic Capacitor".

* cited by examiner

*Primary Examiner*—Karl Group
(74) *Attorney, Agent, or Firm*—Antonelli, Terry, Stout & Kraus, LLP

(57) ABSTRACT

A dielectric ceramic composition having high static capacitance and high dielectric constant and satisfying X7R characteristics and a multilayer ceramic capacitor using the same is provided. The dielectric ceramic composition comprises barium titanate as a main component, and comprises magnesium oxide, dysprosium oxide, barium oxide, calcium oxide, and vanadium oxide, as subcomponents, wherein magnesium oxide converted into MgO is 1 to 3 mol, dysprosium oxide converted into $Dy_2O_3$ is 1 to 5 mol, total of barium oxide and calcium oxide converted into BaO and CaO, respectively, is 0.1 to 5 mol, and vanadium oxide converted into $V_2O_5$ is 0.01 to 0.1 mol, when barium titanate converted into $BaTiO_3$ is 100 mol.

7 Claims, No Drawings

DIELECTRIC CERAMIC COMPOSITION AND MULTILAYER CERAMIC CAPACITOR USED THE SAME

BACKGROUND THE INVENTION

The present invention relates to a dielectric ceramic composition suitable for a nickel electrode multilayer ceramic capacitor in which low temperature sintering can be carried out, and in particular, relates to a dielectric ceramic composition and to a multilayer ceramic capacitor using the same, which satisfy X7R characteristics as a temperature characteristic of capacitance and which have reduction resistance in which there is little dielectric loss at or above room temperature.

Hitherto, compositions consisting of barium titanate are widely used as dielectric materials for multilayer ceramic capacitors, since the dielectric constant is high, the temperature characteristic is superior, the bias dependence is small, and the withstand voltage is superior.

Generally, a multilayer ceramic capacitor is produced by the following method. That is, dielectric powder such as barium titanate is mixed with an organic binder; then, the mixture is suspended and is formed in the shape of a sheet by the doctor blade method, and a dielectric ceramic layer is thereby produced. Furthermore, metal powder for an internal electrode is mixed with organic compounds such as organic solvent, plasticizer, and organic binder, to form a metal powder paste, and the paste is printed on the above dielectric ceramic layer by screen printing. Next, the dielectric ceramic layers are dried and are then alternatingly laminated and adhered; organic components are then removed by a heating treatment at about 300° C. in air and are sintered at 1000° C. or more. Subsequently, external electrodes are bonded by heating at both ends of the dielectric ceramic layer, and a multilayer ceramic capacitor is thereby produced. Although the sintering temperature is generally about 1000° C. when lead is used in the dielectric ceramic composition, it is necessary to carry out sintering at about 1300° C. or more when barium titanate is used therein because sintering characteristics are different. Thus, in the production method for a multilayer ceramic capacitor, the dielectric layers and the internal electrode metal layers are sintered at the same time.

As metals used in the internal electrode of the multilayer ceramic capacitor, heretofore, noble metals such as silver, palladium, platinum, gold, etc., in powder form, or base metals such as nickel, cobalt, iron, molybdenum, tungsten, etc., in powder form have been used, but since less expensive electronic materials are recently required, development of a multilayer ceramic capacitor using the latter base metal powder, in particular, metallic nickel powder, is widely employed. A sintering process in the above production method for the multilayer ceramic capacitor can also be carried out in an oxygen atmosphere when a noble metal powder is used in the internal electrode. However, when a base metal such as nickel is used therein, an insulation oxide is formed in an oxidizing atmosphere at high temperatures. Therefore, it is necessary to carry out the sintering in a reducing atmosphere such as hydrogen gas in this case.

In the production method for the multilayer ceramic capacitor, in order to remove organic constituents, an oxidation-reduction reaction is generated by carrying out heat treatment in air, or by carrying out the sintering in a reducing atmosphere in the case of the nickel electrode, as described above, and a volume change due to expansion and shrinkage is generated in the metal powder. In addition, a volume change is also generated in the dielectric by sintering; however, sintering characteristics such as volume changes due to expansion and shrinkage of each material in sintering, etc., are different, since different materials such as the dielectric and the metal powder are sintered at the same time. Warp is thereby generated in a metal paste layer, and as a result, there is a problem in that structural defects in which the layered structure is destroyed by a so-called "delamination" such as crack or peeling. Therefore, as a dielectric material, materials which can be sintered at as low a temperature as possible are required.

In addition, as a dielectric material, heretofore, materials which maintain an equilibrium state with oxygen in air were used, since they form oxides. However, in dielectrics used therefor, reduction resistance (or non-reducibility) is required, in which the characteristics are not affected by oxygen partial pressure, that is, in which it is reduced, does not turn into semiconductor, and is stable, even if the oxygen partial pressure is low, since the multilayer ceramic capacitor in the nickel electrode is sintered in the reducing atmosphere described above.

Therefore, in order to solve the above problem, various research has been conducted with regard to non-reducing dielectric ceramic compositions. Specifically, a multilayer ceramic chip capacitor comprising a dielectric layer containing $BaTiO_3$ as a main component, and containing $MgO$, $Y_2O_3$, at least one of $BaO$ and $CaO$, $SiO_2$, $MnO$, and at least one of $V_2O_5$, and $MoO_3$, as a subcomponent, wherein the subcomponent comprises 0.1 to 3 mol of $MgO$, 5 mol or less of $Y_2O_3$, 2 to 12 mol of $BaO$ and $CaO$, 2 to 12 mol of $SiO_2$, 0.5 or less mol of $MnO$, 0 to 0.3 mol of $V_2O_5$, 0 to 0.3 mol of $MoO_3$, and more than 0 mol of $V_2O_5$ and $MoO_3$, when $BaTiO_3$ is 100 mol, is disclosed in Japanese Unexamined Patent Publication No. 8-124785.

In addition, a dielectric ceramic composition comprising a main component in which x and y satisfy $0.01 \leq x \leq 0.1$ and $0.1 < y < 0.26$, respectively, when the chemical formula of the main component is represented by $(Ba_{1-x}Ca_x)(Ti_{1-y}Zr_y)O_3$, and comprising 0.2 to 1 weight parts of $Y_2O_3$, 0.06 to 0.6 weight parts of $MnO_2$, 0.1 to 1 weight parts of $Al_2O_3$, 0.1 to 1 weight parts of $NiO$ and 0.1 to 1 weight parts of $(1-\alpha)Li_2O-\alpha SiO_2(0.3<\alpha(\text{mole ratio})<0.7)$, to 100 parts of the main component, is disclosed in Japanese Unexamined Patent Publication No. 10-139538.

Furthermore, a dielectric ceramic composition comprising a barium titanate solid solution and additional components and comprising a sintering promoter as a subcomponent, wherein a main component is within an range of $0.950 \leq A/B$ (mole ratio) $\leq 1.050$, $0.12 < a \leq 0.30$, and $0.04 \leq b \leq 0.30$, when the chemical formula of the dielectric ceramic composition is represented by ABO3 +aR+bM (ABO3 is a barium titanate solid solution; R is an oxide of metal elements selected from La, Ce, Pr, Nd, Sm, Eu, Gd, Th, Dy, Ho, Er, Tm, Yb, and Lu; M is oxide of metal elements selected from Ni, Mg, Fe, Al, Cr, and Zn; and a and b are the mole ratio converted into the chemical formula including one metal element of each oxide).

The above conventional technologies improve reduction resistance and low temperature sintering of the dielectric material, and in addition, satisfy X7R characteristics, and they have moderate effects in reliability, bias characteristics, etc. However, with recent demands such as for rapid miniaturization of portable telephones, personal computers, etc., or increase in capacitance, a dielectric layer of the multilayer ceramic capacitor is required to be thin, and the thickness thereof is required at present to be 10 $\mu$m or less. In this case, there is a problem in that the withstand voltage between a pair of internal electrodes is reduced when the dielectric layer is thinned. In addition, since it is required to have low electric power consumption form the viewpoint of energy conservation, dielectric materials which have low dielectric loss at or above room temperature and are exothermic, are desired.

DISCLOSURE OF THE INVENTION

It is an object of the present invention to provide a dielectric ceramic composition suitable for a multilayer ceramic capacitor in which an internal electrode is made of nickel, and to provide a multilayer ceramic capacitor using the same. Specifically, it is an object thereof to provide a dielectric ceramic composition in which the dielectric constant is high; low temperature sintering can be carried out in a reducing atmosphere; X7R characteristics are satisfied; and reduction resistance is such that there is little dielectric loss at or above room temperature, and to provide a multilayer ceramic capacitor having superior bias characteristics.

The inventors have conducted various research with regard to the above problems which were unsolved in the prior art, and they have researched with regard to type and compounding ratio of rare earth elements, using barium titanate as a main component. As a result, the inventors have found that a dielectric ceramic composition satisfies X7R characteristics and has little dielectric loss at or above room temperature and that a multilayer ceramic capacitor using the dielectric ceramic composition is superior in bias characteristics, and the present invention was thereby completed.

That is, a dielectric ceramic composition according to a first embodiment of the present invention has been made on the basis of the above knowledge, and it is characterized by comprising barium titanate, as a main component and comprising magnesium oxide, dysprosium oxide, barium oxide, calcium oxide, and vanadium oxide, as a subcomponent, wherein magnesium oxide converted into MgO is 1 to 3 mol, dysprosium oxide converted into $Dy_2O_3$ is 1 to 5 mol, the total of barium oxide and calcium oxide converted into BaO and CaO, respectively, is 0.1 to 5 mol, and vanadium oxide converted into $V_2O_5$ is 0.01 to 0.1 mol, when barium titanate converted into $BaTiO_3$ is 100 mol.

A dielectric ceramic composition according to a second embodiment of the present invention is characterized by comprising barium titanate, as a main component and comprising magnesium oxide, dysprosium oxide, barium oxide, calcium oxide, silicon oxide, manganese oxide, and at least one of tantalum oxide, tungsten oxide, and vanadium oxide, as a subcomponent, wherein magnesium oxide converted into MgO is 1 to 3 mol, dysprosium oxide converted into $Dy_2O_3$ is 1 to 5 mol, the total of barium oxide and calcium oxide converted into BaO and CaO, respectively, is 0.1 to 5 mol, silicon oxide converted into $SiO_2$ is 1 to 5 mol, manganese oxide converted into MnO is 0.1 to 1 mol, and the total of tantalum oxide, tungsten oxide, and vanadium oxide converted into $Ta_2O_5$, $WO_3$, and $V_2O_5$, respectively, is 0.01 mol or more and 1 mol or less, when barium titanate converted into $BaTiO_3$ is 100 mol. In the second embodiment, it is preferable that vanadium oxide be comprised as an essential component, and that at least one of tantalum oxide and tungsten oxide be comprised.

In addition, a dielectric ceramic composition according to a third embodiment of the present invention is characterized by comprising barium titanate, as a main component, and comprising magnesium oxide, dysprosium oxide, barium oxide, calcium oxide, silicon oxide, manganese oxide, and at least one of tantalum oxide, tungsten oxide, vanadium oxide, and molybdenite oxide, as a subcomponent, wherein magnesium oxide converted into MgO is 1 to 3 mol, dysprosium oxide converted into $Dy_2O_3$ is 1 to 5 mol, the total of barium oxide and calcium oxide converted into BaO and CaO, respectively, is 0.1 to 5 mol, silicon oxide converted into $SiO_2$ is 1 to 5 mol, manganese oxide converted into MnO is 0.1 to 1 mol, and the total of tantalum oxide, tungsten oxide, vanadium oxide, and molybdenite oxide converted into $Ta_2O_5$, $WO_3$, $V_2O_5$, and $MoO_3$, respectively, is 0.01 mol or more and 1 mol or less, when barium titanate converted into $BaTiO_3$ is 100 mol. In the third embodiment, it is preferable that vanadium oxide be comprised as an essential component, and that at least one of tantalum oxide, tungsten oxide, and molybdenite oxide be comprised.

Furthermore, a multilayer ceramic capacitor according to the present invention is characterized by using the above dielectric ceramic composition. In the following explanation, the mole amount of oxide refers to an amount at which barium titanate converted into $BaTiO_3$ is 100 mol.

According to the first dielectric ceramic composition of the present invention, sintering characteristics are improved by comprising dysprosium oxide, barium oxide, calcium oxide, and vanadium oxide in a dielectric ceramic composition in which barium titanate is a main component, in particular, by comprising dysprosium oxide, as a rare earth element, and therefore, a dielectric ceramic composition, which satisfies X7R characteristics even in sintering at a low temperature of 1300° C. or less, and which has hardly any dielectric loss at or above room temperature, can be obtained.

In particular, the dielectric ceramic composition has a dielectric loss in a high temperature region of 30 to 150° C. which is 0.5% or less and which is much smaller than those of conventional compositions, and it is superior to reliability. Therefore, the dielectric ceramic composition of the present invention is useful as a dielectric material or as an intermediate material for a high dielectric constant ceramic capacitor, an axial condenser, a disk condenser, thick film capacitor, etc, as well as for a nickel electrode multilayer ceramic capacitor.

In addition, since dielectric characteristics are superior even in sintering at 1300° C. or less, the rate of occurrence of structural defects such as delamination decreases in the production of the multilayer ceramic capacitor.

Furthermore, the effect of the present invention is further improved by adding the following components to the above components.

1) silicon oxide
2) silicon oxide, and manganese oxide
3) silicon oxide, manganese oxide, and molybdenum oxide
4) tantalum oxide, silicon oxide, and manganese oxide
5) tungsten oxide, silicon oxide, and manganese oxide
6) silicon oxide, manganese oxide, and at least one of tantalum oxide and tungsten oxide The contents of the above components is 1 to 5 mol of silicon oxide converted into $SiO_2$, 0.1 to 1 mol of manganese oxide converted into MnO, 0.05 to 0.2 mol of molybdenum oxide converted into $MoO_3$, 0.01 to 1 mol of tantalum oxide converted into $Ta_2O_5$, and 0.01 to 1 mol of tungsten oxide converted into $WO_3$, and the total of tantalum oxide and tungsten oxide converted into $Ta_2O_5$ and $WO_3$, respectively, is 0.01 mol or more and 1 mol or less.

The multilayer ceramic capacitor using the above dielectric ceramic composition is superior to those used in the conventional dielectric ceramic compositions in bias characteristics in a high voltage region as well as static capacitance and temperature characteristics.

BEST MODE FOR CARRYING OUT THE INVENTION

In the following, the reasons for the above numerical limitations will be explained with the effects of the present invention.

Magnesium Oxide: 1 to 3 mol Converted into MgO

When the content of magnesium oxide is under 1 mol, the temperature changing rate of capacitance deteriorates, and it is difficult to decrease the aging deterioration of capacitance. In contrast, when the content of magnesium oxide exceeds 3 mol, the sintering characteristics rapidly deteriorate, the density thereof is insufficient, and thereby the insulation resistance accelerated life is reduced and a high dielectric constant is not obtained. Therefore, the content of magnesium oxide is specified to be 1 to 3 mol converted into MgO. The more preferable content thereof is 1 to 2 mol.

Dysprosium Oxide: 1 to 5 mol Converted into $Dy_2O_3$

Dysprosium oxide adjusts the dielectric constant and the insulation resistance of the dielectric porcelain composition, and it has an effect in which the insulation resistance accelerated life is improved and is thereby also improved in the DC bias characteristics. In addition, the largest effect of dysprosium oxide is to remarkably improve the sintering characteristic in comparison with rare earth metals such as yttrium oxide, and the sintering at low temperatures can thereby be carried out. When the content of dysprosium oxide is under 1 mol, the above effect due to addition becomes insufficient, and in particular, the DC bias characteristics become insufficient. In contrast, when the content of dysprosium oxide exceeds 5 mol, the dielectric constant is reduced. Therefore, the content of dysprosium oxide is specified to be 1 to 5 mol converted into $Dy_2O_3$. The more preferable content thereof is 1 to 2 mol.

Barium Oxide and Calcium Oxide: Total 0.1 to 5 mol Converted into BaO and CaO

When the total content of barium oxide and calcium oxide is under 0.1 mol, the aging deterioration of capacitance in loading DC electric field increases. In addition, the insulation resistance accelerated life becomes insufficient, and the temperature characteristics of capacitance deviate from the desire range. In contrast, when the total content of barium oxide and calcium oxide exceeds 5 mol, the insulation resistance accelerated life becomes insufficient and the dielectric constant rapidly decreases. Therefore, the total content of barium oxide and calcium oxide is specified to be 0.1 to 5 mol converted into BaO and CaO, respectively. The more preferable total content thereof is 0.3 to 3 mol, and the most preferable total content thereof is 0.5 to 1.5 mol. The content of barium oxide is preferably 0.1 to 3 mol, and more preferably 0.3 to 1.5 mol, converted into BaO. The content of calcium oxide is preferably 0.1 to 3 mol, and more preferably 0.3 to 1.5 mol, converted into CaO.

Vanadium Oxide: 0.01 to 0.1 mol Converted into $V_2O_5$

The vanadium oxide improves not only aging deterioration of capacitance under DC electric field, but also the dielectric breakdown voltage. When the content of the vanadium oxide is under 0.01 mol, it is difficult to obtain the effects. In contrast, when it exceeds 0.1 mol, extreme reduction of the initial insulation resistance is caused. Therefore, the content of vanadium oxide is specified to be 0.01 to 0.1 mol converted into $V_2O_5$. The content is preferably 0.02 to 0.1 mol.

In the present invention, the present invention is further improved by adding the following oxides.

Silicon Oxide: 1 to 5 mol Converted into $SiO_2$

When the content of silicon oxide is under 1 mol, the sinterability is reduced, and thereby the density thereof is easily insufficient. In contrast, when the content exceeds 5 mol, the initial insulation resistance tends to be too low. Therefore, it is desirable that the content of silicon oxide converted into $SiO_2$ be 1 to 5 mol. The content is preferably 1 to 3 mol.

Manganese Oxide: 0.1 to 1 mol Converted into MnO

Manganese oxide increases the density of the dielectric layer and improves dielectric loss tan δ of the dielectric ceramic composition, and in addition, it has an effect in which the insulation resistance accelerated life is improved. When the content of manganese oxide is under 0.1 mol, it is difficult to obtain the effect. In contrast, when the content of manganese oxide exceeds 1 mol, it is difficult to decrease the aging deterioration of capacitance in loading a DC electric field. Therefore, it is desirable that the content of manganese oxide be 0.1 to 1 mol converted into MnO. The content is preferably 0.05 to 0.15 mol.

Molybdenum Oxide: 0.05 to 0.2 mol Converted into $MoO_3$

Molybdenum oxide improves the aging deterioration of capacitance under a DC electric field, and in addition, the accelerated life of insulation resistance. When the content of molybdenum oxide is under 0.05 mol, it is difficult to obtain the effect. In contrast, when it exceeds 0.2 mol, extreme reduction of the insulation resistance easily occurs. Therefore, it is desirable that the content of molybdenum oxide be 0.05 to 0.2 mol converted into $MoO_3$. The content is preferably 0.05 to 0.1 mol.

Tantalum Oxide: 0.01 to 1 mol Converted into $Ta_2O_5$

Tantalum oxide improves the aging deterioration of capacitance in the same manner as vanadium oxide. Furthermore, it has also an effect of slightly increasing the dielectric constant. When the content of tantalum oxide is under 0.01 mol, it is difficult to obtain the effect. In contrast, when it exceeds 1 mol, reduction of the initial insulation resistance occurs. Therefore, the content of tantalum oxide is specified to be 0.01 to 1 mol converted into $Ta_2O_5$.

Tungsten Oxide: 0.01 to 1 mol Converted into $WO_3$

Tungsten oxide improves the aging deterioration of capacitance in the same manner as vanadium oxide and tantalum oxide. Furthermore, it has also an effect of slightly increasing the dielectric constant. When the content of tungsten oxide is under 0.01 mol, it is difficult to obtain the effect. In contrast, when it exceeds 1 mol, reduction of the initial insulation resistance occurs. Therefore, the content of tungsten oxide is specified to be 0.01 to 1 mol converted into $WO_3$.

In the present invention, at least one of the above tantalum oxide and tungsten oxide may be contained, but when both are contained, it is desirable that they be contained within $0.05 \text{ mol} \leq Ta_2O_5 + WO_3 \leq 1$ mol.

In the second dielectric ceramic composition of the present invention, it is necessary that the total amount of tantalum oxide, tungsten oxide, and vanadium oxide satisfy $0.01 \text{ mol} \leq Ta_2O_5 + WO_3 + V_2O_5 \leq 1$ mol converted into $Ta_2O_5$, $WO_3$, and $V_2O_5$, respectively. Vanadium oxide also has the same functions as those of tantalum oxide and tungsten oxide. By containing total 0.01 mol or more of these oxides, the dielectric breakdown voltage is improved, as well as the aging deterioration of capacitance under a DC electric field. The extreme reduction of the initial insulation resistance occurs when the total amount of the above oxides exceeds 1 mol.

In the third dielectric ceramic composition of the present invention, it is necessary that the total amount of tantalum oxide, tungsten oxide, vanadium oxide, and molybdenum oxide satisfy $0.01 \text{ mol} \leq Ta_2O_5 + WO_3 + V_2O_5 + MoO_3 \leq 1$ mol converted into $Ta_2O_5$, $WO_3$, $V_2O_5$, and $MoO_3$, respectively. Molybdenum oxide also has the same functions as those of tantalum oxide to vanadium oxide. By containing total 0.01 mol or more of these oxides, the dielectric breakdown voltage is improved, as is the aging deterioration of capacitance under a DC electric field. The extreme reduction of the initial insulation resistance occurs when the total amount of the above oxides exceeds 1 mol.

In addition, it is desirable that the average crystalline particle diameter of the dielectric ceramic composition in the present invention be 2 μm or less. Thus, a thin dielectric layer can be formed, and therefore, the multilayer ceramic capacitor can be stably produced. In order to obtain the average crystalline particle diameter, it is desirable that the average particle size of raw material powder be 0.5 to 1.5 μm.

The property of barium titanate used in the present invention is not specifically limited, but in particular, it is preferable that the average particle size thereof be 0.1 to 1 μm and that the specific surface thereof be 1 to 10. As a production method for barium titanate used as a raw material, well-known methods such as a solid phase method, hydrothermal method, etc., can be used. However, methods using liquid-phase methods (called a "sol-gel method" or a "synthesis colloid method", etc.) are more preferable than the above methods using reactions by heating to a high temperature. Specifically, as the methods, an aqueous solution of a titanium compound such as titanium tetrachloride, etc., and an aqueous solution of barium compound such as barium hydroxide, barium chloride, etc., are reacted by contacting each other in an alkali range at 100° C. or less. More specifically, an aqueous solution of a titanium compound and an alkali aqueous solution of barium compound are contacted with each other while stirring and controlling the mole ratio of titanium compound and barium compound to 0.8 to 1.2.

As a titanium compound, at least one selected from halide, hydroxide, nitrate, sulfate, acetate, perchlorate, oxalate, and alkoxide, can be used. As a specific titanium compound, titanium tetrachloride, titanium trichloride, titanium hydroxide, titanyl sulfate, etc., can be mentioned, and of these, titanium tetrachloride can be preferably used. As a barium compound, at least one selected from halide, hydroxide, nitrate, sulfate, acetate, perchlorate, oxalate, and alkoxide, can be used. As a specific barium compound, barium chloride, barium hydroxide, barium nitrate, barium sulfate, barium acetate, etc., can be mentioned, and of these, barium chloride or barium hydroxide can be preferably used. In addition, barium hydroxide, which is produced by preliminarily contacting a hydroxide of an alkali metal such as NaOH, KOH, etc., with barium salt compound (halide, nitrate, sulfate, acetate, etc.) such as barium chloride, and by reacting by heating, may be used. Furthermore, the barium titanate obtained as above may be used after pre-sintering.

In the production method of the dielectric ceramic composition of the present invention, each component described as above is mixed in a specific amount and is then subjected to a dry-type or wet-type classification and blending. In order to more uniformly disperse and mix, the latter wet-type blending is preferable, and it is also preferable to add dispersing agent such as ammonium polyacrylate in this case. Subsequently, the mixture of barium titanate and subcomponents is sintered by heating. Each subcomponent can be used in the form of oxide as a raw material, and in particular, it can also be used in the form of carbonate and hydroxide as a raw material in order to improve the other reactivities.

In the case in which silicon oxide is comprised as the other component in the dielectric ceramic composition of the present invention, the dielectric ceramic composition may be produced by preliminarily mixing silicon oxide alone. However, it is desirable that the dielectric ceramic composition be produced by mixing 3 components of silicon compounds such as silicon oxide, etc.; barium compounds such as barium oxide, barium carbonate, etc.; and calcium compounds such as calcium oxide, calcium carbonate, etc., and by pre-sintering, and then, by sintering after mixing with other components. In this case, the temperature of the pre-sintering is preferably 800 to 1100° C., and is more preferably 1000° C. The characteristics of the dielectric ceramic composition, in particular, the dielectric life at which the multilayer ceramic capacitor is constituted, is improved by using this production method.

Next, an example of a production method for a multilayer ceramic capacitor in which a dielectric ceramic composition of the present invention and in which an internal electrode is made of nickel is used will be explained in the following.

Firstly, an organic vehicle in which a powder of the dielectric ceramic composition of the present invention and a binder such as ethyl cellulose, etc., are dissolved in an organic solvent is kneaded, and a dielectric paste is prepared. On the other hand, metallic nickel super fine powder having an average particle size of 0.2 to 0.4 μm is kneaded with the above organic vehicle, and a paste for a metal electrode is prepared. Next, the dielectric paste is formed in a sheet by a doctor blade method, and a dielectric greensheet is produced. On the other hand, the metallic nickel paste for an internal electrode is printed on the above greensheet by a screen printing. They are alternately laminated, and a green chip is formed by cutting in the desire shape. Subsequently, the green chip is heated at 250 to 300° C. in air, and a binder removing process is carried out. Next, it is sintered within a temperature range of 1100 to 1300° C. in a reducing atmosphere such as hydrogen gas, and a multilayer ceramic capacitor is formed. Then, it is annealed in an oxygen atmosphere in a temperature range of 500 to 1000° C., and a process for reoxidizing the dielectric layer is carried out.

EXAMPLES

In the following, the present invention is explained in detail by using specific examples of the present invention.

Example 1

Mole amounts shown in Table 1 of magnesium oxide, dysprosium oxide, barium carbonate, calcium carbonate, silicon oxide, manganese carbonate, vanadium oxide, and molybdenum oxide, were added to 100 mol of barium titanate having an average particle size of 0.5 μm, and the mixture was wet-blended and crushed for 16 hours by a ball mill using zirconia balls. The blended and crushed powder was molded and sintered at 1250° C. for 2 hours, and a compact of the composition ratio (mole ratio) shown in Table 1 having a thickness of 1.14 mm was thereby produced.

Subsequently, with respect to the sintered compact, static capacitance, dielectric constant, and dielectric loss, at various temperatures, were measured. The evaluated results of the dielectric ceramic composition are shown in Table 2. In addition, the changing rate of static capacitance at a standard temperature of 25° C. (X7R characteristics according to the EIA standard: TCC (temperature characteristics of capacitance)) is also shown in Table 2.

The evaluations with respect to each sample were carried out as follows.

(1) Static capacitance, dielectric constant, and dielectric loss (tan δ): Static capacitance, dielectric constant, and dielectric loss (tan δ) were measured by an LCR meter (1 KHz, 1 V).
(2) Temperature characteristics of capacitance (TCC): Capacitance at −55 to 125° C. was measured by an LCR meter at a measurement voltage 1 V, and it was examined whether the changing rate of static capacitance satisfies within ±15% (Standard temperature 25° C.) (X7R characteristics).

Example 2 and Comparative Examples 1 to 3

The evaluations were carried out in the same manner as Example 1 except that each component was changed to the composition ratio showed in Table 1. The results are shown in Tables 2 and 3. The thickness of the compact of Example 2 was 1.27 mm, that of Comparative Example 1 was 1.10 mm, that of Comparative Example 2 was 1.31 mm, and that of Comparative Example 3 was 1.27 mm.

TABLE 1

|  | Example 1 | Example 2 | Comparative Example 1 | Comparative Example 2 | Comparative Example 3 |
|---|---|---|---|---|---|
| $BaTiO_3$ | 100 | 100 | 100 | 100 | 100 |
| MgO | 2.00 | 2.00 | 2.00 | 2.00 | 0.67 |
| $Dy_2O_3$ | 2.13 | 2.13 | — | — | 2.13 |
| $Y_2O_3$ | — | — | 2.13 | 2.13 | — |
| BaO | 0.58 | 1.74 | 0.58 | 1.76 | 0.58 |
| CaO | 0.42 | 1.26 | 0.42 | 1.26 | 0.42 |
| $SiO_2$ | 3.00 | 3.00 | 3.00 | 3.00 | 3.00 |
| MnO | 0.375 | 0.375 | 0.375 | 0.375 | 0.375 |
| $V_2O_5$ | 0.05 | 0.05 | 0.05 | 0.05 | 0.05 |
| $MoO_3$ | 0.10 | 0.10 | 0.10 | 0.10 | 0.10 | were 1078 to 1112 pF and 1064 to 1085 pF, respectively, and they were larger than those of the Comparative Examples: those of Comparative Example 1 were 996 to 1038 pF, Comparative Examples 2 were 935 to 972 pF, and Comparative Example 3 were 940 to 1046 pF. The dielectric constants of Examples 1 and 2 were 2505 to 2583 and 2754 to 2808, respectively, and they were larger and more stable than those of the Comparative Examples: those of Comparative Example 1 were 2233 to 2327, Comparative Example 2 were 2496 to 2595, and Comparative Example 3 were 2433 to 2707. In addition, the dielectric losses of Examples 1 and 2 were 0.42 to 0.63% and 0.55 to 0.69%, respectively, and they tended to be less than those of the Comparative Examples: those of Comparative Example 1 were 0.50 to 0.56Comparative Example 2 were 0.60 to 0.69%, and Comparative Example 3 were 0.76 to 0.85%. Thus, it was confirmed that dielectric ceramic compositions of the present invention are superior to those of Comparative Examples in static capacitance, dielectric constant, and dielectric loss.

TABLE 2

| | Example 1 | | | | Example 2 | | | |
|---|---|---|---|---|---|---|---|---|
| Temperature (° C.) | Electric Capacity (pF) | Dielectric Constant | Dielectric Loss (%) | TCC (25° C. standard) (%) | Electric Capacity (pF) | Dielectric Constant | Dielectric Loss (%) | TCC (25° C. standard) (%) |
| −55 | 994 | 2309 | 1.24 | −10.34 | 964 | 2495 | 1.41 | −11.23 |
| −35 | 1019 | 2366 | 0.99 | −8.13 | 1003 | 2596 | 1.15 | −7.64 |
| −15 | 1048 | 2436 | 0.79 | −5.43 | 1036 | 2681 | 0.87 | −4.60 |
| 5 | 1078 | 2505 | 0.63 | −2.73 | 1064 | 2754 | 0.69 | −2.02 |
| 20 | 1101 | 2558 | 0.53 | −0.67 | 1079 | 2793 | 0.60 | −0.64 |
| 25 | 1109 | 2576 | 0.50 | 0 | 1086 | 2811 | 0.61 | 0 |
| 25 | 1109 | 2577 | 0.50 | 0.04 | 1081 | 2798 | 0.57 | −0.46 |
| 35 | 1112 | 2583 | 0.42 | 0.27 | 1085 | 2808 | 0.55 | −0.09 |
| 45 | 1105 | 2567 | 0.40 | −0.33 | 1066 | 2759 | 0.46 | −1.84 |
| 55 | 1082 | 2514 | 0.36 | −2.40 | 1049 | 2715 | 0.46 | −3.40 |
| 65 | 1052 | 2444 | 0.32 | −5.12 | 1029 | 2663 | 0.42 | −5.24 |
| 85 | 1001 | 2325 | 0.28 | −9.72 | 1001 | 2591 | 0.40 | −7.82 |
| 105 | 978 | 2272 | 0.26 | −11.78 | 999 | 2586 | 0.41 | −8.01 |
| 125 | 989 | 2298 | 0.25 | −10.78 | 1041 | 2694 | 0.40 | −4.14 |
| 135 | 885 | 2056 | 0.25 | −20.16 | 976 | 2526 | 0.40 | −10.12 |
| 150 | 739 | 1717 | 0.26 | −33.33 | 844 | 2184 | 0.43 | −22.28 |

TABLE 3

| | Comparative Example 1 | | | | Comparative Example 2 | | | | Comparative Example 3 | | | |
|---|---|---|---|---|---|---|---|---|---|---|---|---|
| Temperature (° C.) | Electric Capacity (pF) | Dielectric Constant | Dielectric Loss (%) | TCC (25° C. standard) (%) | Electric Capacity (pF) | Dielectric Constant | Dielectric Loss (%) | TCC (25° C. standard) (%) | Electric Capacity (pF) | Dielectric Constant | Dielectric Loss (%) | TCC (25° C. standard) (%) |
| −55 | 938 | 2103 | 1.01 | −8.71 | 856 | 2285 | 1.30 | −11.20 | 808 | 2091 | 1.11 | −19.68 |
| −35 | 954 | 2139 | 0.76 | −7.16 | 885 | 2363 | 1.04 | −8.19 | 842 | 2179 | 0.95 | −16.30 |
| −15 | 976 | 2188 | 0.65 | −5.02 | 910 | 2429 | 0.82 | −5.60 | 881 | 2280 | 0.78 | −12.43 |
| 5 | 996 | 2233 | 0.56 | −3.07 | 935 | 2496 | 0.69 | −3.00 | 940 | 2433 | 0.84 | −6.56 |
| 20 | 1020 | 2287 | 0.55 | −0.73 | 954 | 2547 | 0.62 | −1.03 | 996 | 2578 | 0.85 | −0.99 |
| 25 | 1028 | 2304 | 0.54 | 0 | 964 | 2574 | 0.64 | 0 | 1006 | 2604 | 0.78 | 0 |
| 25 | 1029 | 2306 | 0.54 | 0.11 | 962 | 2568 | 0.60 | −0.20 | 1005 | 2601 | 0.76 | −0.10 |
| 35 | 1038 | 2327 | 0.50 | 1.01 | 972 | 2595 | 0.60 | 0.82 | 1046 | 2707 | 0.82 | 3.98 |
| 45 | 1042 | 2336 | 0.54 | 1.39 | 962 | 2568 | 0.54 | −0.20 | 1050 | 2718 | 0.71 | 4.37 |
| 55 | 1034 | 2317 | 0.55 | 0.58 | 954 | 2547 | 0.53 | −1.03 | 1073 | 2777 | 0.76 | 6066 |
| 65 | 1021 | 2289 | 0.55 | −0.65 | 943 | 2518 | 0.50 | −2.17 | 1081 | 2798 | 0.70 | 7.45 |
| 85 | 1012 | 2268 | 0.57 | −1.56 | 931 | 2486 | 0.48 | −3.42 | 1093 | 2829 | 0.72 | 8.65 |
| 105 | 1040 | 2332 | 0.61 | 1.21 | 942 | 2515 | 0.48 | −2.28 | 1109 | 2870 | 0.69 | 10.24 |
| 125 | 1143 | 2562 | 0.64 | 11.20 | 997 | 2662 | 0.48 | 3.42 | 1215 | 3145 | 0.63 | 20.78 |
| 135 | 1032 | 2314 | 0.66 | 0.44 | 953 | 2544 | 0.48 | −1.14 | 1133 | 2932 | 0.64 | 12.62 |
| 150 | 853 | 1912 | 0.70 | −16.99 | 835 | 2229 | 0.50 | −13.38 | 940 | 2433 | 0.67 | −6.56 |

Each characteristic at a practical temperature (5 to 35° C.) was compared. The static capacitances of Examples 1 and 2

Furthermore, with respect to the X7R characteristics, it is specified that the changing rate of the static capacitance at a range of −55 to 125° C. (TCC) is within ±15% (25° C. standard). The X7R characteristics of Examples 1 and 2 of the present invention were 11.23% and 12.06%, respectively, and they were drastically less than those of the Comparative Examples: that of Comparative Example 1 was 19.92%, Comparative Example 2 was 14.62%, and Comparative Example 3 was 40.46%. Therefore, it was confirmed that the present invention satisfied the X7R characteristics and that the X7R characteristics was superior.

characteristic, DC bias voltage was loaded to the multilayer ceramic capacitor at room temperature, and the changing rate of static capacitance was measured as the bias voltage changed. The results are shown in Table 5.

Comparative Example 4

A multilayer ceramic capacitor was produced in the same manner as those of Example 3 except that the dielectric ceramic composition produced in Comparative Example 1 was used, and this was evaluated. The results are shown in Table 5.

TABLE 4

| | Example 3 | | | | Comparative Example 4 | | | |
| --- | --- | --- | --- | --- | --- | --- | --- | --- |
| Temperature (° C.) | Electric Capacity (μF) | Dielectric Constant | Dielectric Loss (%) | TCC (25° C. standard) (%) | Electric Capacity (μF) | Dielectric Constant | Dielectric Loss (%) | TCC (25° C. standard) (%) |
| −55 | 0.1354 | 2994 | 3.14 | 0.35 | 0.1259 | 2785 | 2.94 | 1.05 |
| −35 | 0.1343 | 2970 | 2.31 | −0.44 | 0.1215 | 2688 | 2.07 | −2.49 |
| 5 | 0.1330 | 2953 | 1.35 | −1.03 | 0.1232 | 2726 | 1.37 | −1.10 |
| 20 | 0.1342 | 2969 | 1.25 | −0.48 | 0.1221 | 2701 | 1.29 | −2.00 |
| 25 | 0.1349 | 2983 | 1.30 | 0 | 0.1246 | 2756 | 1.38 | 0 |
| 35 | 0.1361 | 3009 | 1.52 | 0.87 | 0.1264 | 2795 | 1.66 | 1.41 |
| 65 | 0.1254 | 2775 | 1.17 | −6.99 | 0.1208 | 2672 | 1.42 | −3.06 |
| 85 | 0.1189 | 2631 | 0.83 | −11.8 | 0.1128 | 2496 | 0.99 | −9.45 |
| 105 | 0.1172 | 2591 | 0.57 | −13.1 | 0.1154 | 2553 | 0.68 | −7.38 |
| 125 | 0.1255 | 2776 | 0.37 | −6.96 | 0.1230 | 2722 | 0.45 | −1.26 |
| 135 | 0.1134 | 2508 | 0.22 | −15.93 | 0.1156 | 2557 | 0.27 | −7.24 |
| 150 | 0.0956 | 2114 | 0.18 | −29.13 | 0.0991 | 2193 | 0.22 | −20.44 |

Comparative Example 3 (Production and Evaluation of Multilayer Ceramic Capacitor)

Using the dielectric ceramic composition produced in Example 1, a multilayer ceramic capacitor, in which an internal electrode consists of nickel, was produced by the following methods and was evaluated. A dispersing agent and PVB as a binder were added at specific amounts to the dielectric ceramic composition powder and were mixed by a bead mill, using cellosolve type organic solvent as a dispersion medium, and a slurry was thereby formed. Then, a film was formed by the slurry using a doctor blade method, and a greensheet having a thickness of 20 μm was thereby produced. Nickel powder paste was printed on the greensheet in a specific printed pattern, and an internal electrode was thereby produced. A specific number of the greensheets in which internal electrodes were printed was trimmed and laminated, and then a green layered product was formed by heat-pressing. The green layered product was sintered in a mixed gas of humidified hydrogen and nitrogen at 1300° C. for 2 hours, after removing binder in air at 350° C., and it was annealed in a nitrogen atmosphere at 1000° C. for 6 hours. Copper paste was bonded as an external electrode on the sintered body, and a multilayer ceramic capacitor was thereby produced.

With respect to the multilayer ceramic capacitor produced as above, static capacitance, dielectric loss, and insulation resistance were measured using an LCR meter and an insulation resistance tester. The static capacitance was measured within −55 to ±125° C., and temperature characteristics of the changing rate of static capacitance was obtained by setting a standard on capacitance at 25° C. The results are shown in Table 4. In addition, with respect to the bias

TABLE 5

| Voltage (V) | Example 3 Change rate of Electric Capacity (%) | Comparative Example 4 Change rate of Electric Capacity (%) |
| --- | --- | --- |
| 1 | −0.28 | −0.52 |
| 2 | −0.35 | −0.59 |
| 3 | −0.58 | −0.87 |
| 4 | −0.83 | −1.20 |
| 5 | −1.09 | −1.55 |
| 6 | −1.34 | −1.90 |
| 8 | −1.88 | −2.64 |
| 9 | −2.17 | −3.03 |
| 10 | −2.46 | −3.44 |
| 11 | −2.76 | −3.87 |
| 12 | −3.08 | −4.32 |
| 13 | −3.42 | −4.78 |
| 14 | −3.77 | −5.27 |
| 15 | −4.14 | −5.79 |
| 16 | −4.52 | −6.32 |
| 18 | −5.33 | −7.45 |
| 19 | −5.78 | −8.05 |
| 20 | −6.23 | −8.67 |
| 21 | −6.69 | −9.30 |
| 22 | −7.18 | −9.96 |
| 24 | −8.17 | −11.31 |
| 25 | −8.68 | −12.01 |
| 26 | −9.22 | −12.72 |
| 27 | −9.77 | −13.44 |
| 28 | −10.33 | −14.16 |
| 29 | −10.89 | −14.90 |
| 30 | −11.46 | −15.64 |
| 31 | −12.04 | −16.39 |
| 32 | −12.62 | −17.14 |
| 33 | −13.22 | −17.89 |
| 34 | −13.81 | −18.65 |
| 35 | −14.42 | −19.40 |
| 36 | −15.03 | −20.15 |
| 37 | −15.64 | −20.90 |
| 38 | −16.25 | −21.65 |
| 39 | −16.87 | −22.40 |

The static capacitance of Example 3 at a practical temperature (5 to 35° C.) was 0.1330 to 0.1361 μF and it was larger than that of Comparative Example 4 of 0.1222 to 0.1264 μF. In addition, the dielectric constant of Example 3 was 2953 to 3010, and it was larger than that of Comparative Example 4 of 2701 to 2796. Furthermore, the dielectric loss of Example 3 was 1.26 to 1.5%, and it tended to be less than that of Comparative Example 4 of 1.29 to 1.67%. Thus, it was confirmed that the dielectric ceramic composition of the present invention was superior to that of the Comparative Examples in static capacitance, dielectric constant, and dielectric loss.

In addition, with respect to the changing rate of static capacitance with changing of bias voltage, the difference at 39 V was 16.87% in Example 3, and in contrast, the difference was 22.40% in Comparative Example 4. Therefore, it was confirmed that in the multilayer ceramic capacitor of the present invention, static capacitance was hardly changed and the bias characteristics were superior.

Examples 4 to 9 and Comparative Examples 5 to 16

Dielectric ceramic compositions were produced in the same manner as those of Example 1, except that each component was changed to the composition ratios showed in Table 6. Multilayer ceramic capacitors were produced in the same manner as those of Example 3 except for using the dielectric ceramic compositions. With respect to the multilayer ceramic capacitors, static capacitance, dielectric constant, dielectric loss (tan δ), and temperature characteristics of capacitance (TCC): X7R characteristics, were evaluated. In addition, insulation resistance, accelerated life test of IR, DC bias characteristics, dielectric breakdown voltage, and aging deterioration of capacity, were evaluated. The results were shown in Table 7. In this evaluation, the following criteria were used: cases where the capacitance changing rate satisfied the X7R characteristics: ○; and cases where it did not satisfy them: X. The insulation resistance, the accelerated life test of IR, the DC bias characteristics, the dielectric breakdown voltage, and the aging deterioration of capacity were evaluated by the following methods.

(1) Insulation resistance: 25 V of DC voltage was loaded to the multilayer ceramic capacitor, and insulation resistance was measured by leakage current.

(2) IR accerated life test: 30 V of DC voltage was loaded to the multilayer ceramic capacitor at 150° C., and the aging deterioration of IR thereof was measured. The time at which IR decreased to $10^5 \Omega$ or less was specified to be the life of IR.

(3) DC bias characteristics: Capacitance of the multilayer ceramic capacitor in which DC bias voltage was not loaded was measured, and then the changing rate thereof was obtained by measuring the capacitance thereof in which DC bias voltage was loaded. The changing rate at which loaded voltage was 30 V is shown.

(4) Dielectric breakdown voltage: Dielectric breakdown voltage of the multilayer ceramic capacitor was obtained by loading DC voltage at a pressure increasing rate of 50 V/sec. Voltage at which leakage current was over 1 mA was specified to be breakdown voltage.

(5) Aging deterioration of capacitance: Initial capacitance of the multilayer ceramic capacitor was measured by an LCR meter. Subsequently, DC voltage of 3 V per dielectric layer thickness of 1 μm was loaded at 80° C. for 500 hours, and capacitance thereof was measured in a non-loaded condition. Changing amount was obtained by the measured result and the initial capacitance, and the changing rate of aging deterioration was thereby obtained.

The results are shown in Table 7.

With respect to the multilayer ceramic capacitor produced as above, static capacitance, changing rate of static capacitance, dielectric loss, insulation resistance, accelerated life of IR, DC bias characteristics, dielectric breakdown voltage, and aging deterioration of capacitance were measured. The results are shown in Table 7. In this evaluation, the following criteria were used: cases where the capacitance changing rate satisfied the X7R characteristics: ○; and cases where it did not satisfy them: X.

TABLE 6

|  | $BaTiO_3$ | BaO | CaO | $Dy_2O_3$ | $Y_2O_3$ | MgO | MnO | $SiO_2$ | $V_2O_5$ | $Ta_2O_5$ | $MoO_3$ | $WO_3$ |
|---|---|---|---|---|---|---|---|---|---|---|---|---|
| Example 4 | 100 | 0.58 | 0.42 | 2.13 | — | 2.00 | 0.375 | 3.00 | 0.050 | 0.500 | — | — |
| Example 5 | 100 | 0.58 | 0.42 | 2.13 | — | 2.00 | 0.375 | 3.00 | 0.050 | — | — | 0.500 |
| Example 6 | 100 | 0.58 | 0.42 | 2.13 | — | 2.00 | 0.375 | 3.00 | 0.050 | 0.500 | — | 0.250 |
| Example 7 | 100 | 0.58 | 0.42 | 2.13 | — | 2.00 | 0.375 | 3.00 | 0.050 | 0.250 | — | 0.500 |
| Example 8 | 100 | 0.58 | 0.42 | 2.13 | — | 2.00 | 0.375 | 3.00 | 0.050 | 0.250 | 0.250 | 0.250 |
| Comparative Example 5 | 100 | 0.58 | 0.42 | 2.13 | — | 2.00 | 0.375 | 3.00 | 0.005 | 0.050 | — | — |
| Comparative Example 6 | 100 | 0.58 | 0.42 | 2.13 | — | 2.00 | 0.375 | 3.00 | 0.120 | — | — | 0.050 |
| Comparative Example 7 | 100 | 0.58 | 0.42 | 2.13 | — | 2.00 | 0.375 | 3.00 | 0.120 | 0.500 | 0.250 | 0.250 |
| Example 9 | 100 | 1.74 | 1.26 | 2.13 | — | 2.00 | 0.375 | 3.00 | 0.050 | 0.050 | — | 0.050 |
| Comparative Example 8 | 100 | 1.74 | 1.26 | — | 2.13 | 2.00 | 0.375 | 3.00 | 0.050 | 0.250 | 0.250 | 0.250 |
| Comparative Example 9 | 100 | 1.74 | 3.56 | 2.13 | — | 2.00 | 0.375 | 3.00 | 0.050 | 0.250 | 0.250 | 0.250 |
| Comparative Example 10 | 100 | 1.23 | 2.22 | 5.13 | — | 2.00 | 0.375 | 3.00 | 0.050 | 0.300 | — | — |
| Comparative Example 11 | 100 | 1.56 | 1.22 | 3.12 | — | 0.50 | 0.230 | 2.00 | 0.040 | — | — | 0.210 |
| Comparative Example 12 | 100 | 1.56 | 1.22 | 3.12 | — | 3.20 | 0.230 | 2.00 | 0.040 | — | — | 0.310 |
| Comparative Example 13 | 100 | 1.32 | 1.67 | 2.13 | — | 2.00 | 0.050 | 3.00 | 0.050 | — | — | 0.380 |
| Comparative Example 14 | 100 | 1.32 | 1.67 | 2.13 | — | 2.00 | 1.100 | 2.00 | 0.050 | 0.300 | — | — |
| Comparative Example 15 | 100 | 1.32 | 1.67 | 2.13 | — | 2.00 | 0.213 | 0.50 | 0.050 | 0.300 | — | — |

TABLE 6-continued

| | BaTiO$_3$ | BaO | CaO | Dy$_2$O$_3$ | Y$_2$O$_3$ | MgO | MnO | SiO$_2$ | V$_2$O$_5$ | Ta$_2$O$_5$ | MoO$_3$ | WO$_3$ |
|---|---|---|---|---|---|---|---|---|---|---|---|---|
| Comparative Example 16 | 100 | 1.32 | 1.67 | 2.13 | — | 2.00 | 0.213 | 5.50 | 0.075 | 0.300 | — | — |

TABLE 7

| | Dielectric Constant | tan δ | TCC (25° C. standard) X7R | Insulation Resistance (10$^8$Ω) | IR Accelerated Life (hr) | Dielectric Breakdown Voltage (V) | DC Bias Characteristic at 30 V (%) | Age-deterioration of Electric Capacity (%) |
|---|---|---|---|---|---|---|---|---|
| Example 4 | 2780 | 2.1 | ○ | 6.7 | 18.4 | 556 | −11.7 | −3.9 |
| Example 5 | 2659 | 2.3 | ○ | 7.1 | 19.3 | 546 | −12.0 | −3.8 |
| Example 6 | 2876 | 2.5 | ○ | 7.2 | 21.2 | 578 | −10.0 | −3.7 |
| Example 7 | 2765 | 2.2 | ○ | 8.3 | 23.6 | 564 | −12.5 | −4.1 |
| Example 8 | 2732 | 2.4 | ○ | 7.7 | 25.1 | 577 | −11.6 | −3.5 |
| Comparative Example 5 | 2560 | 3.2 | ○ | 4.5 | 12.3 | 320 | −18.0 | −5.9 |
| Comparative Example 6 | 2610 | 4.0 | ○ | 0.07 | 13.5 | 430 | −12.0 | −6.8 |
| Comparative Example 7 | 2780 | 3.4 | ○ | 0.08 | 14.5 | 563 | −14.9 | −7.2 |
| Example 9 | 2736 | 2.4 | ○ | 7.6 | 20.8 | 591 | −11.6 | −3.2 |
| Comparative Example 8 | 2170 | 2.6 | ○ | 5.5 | 18.3 | 550 | −14.6 | −4.5 |
| Comparative Example 9 | 2120 | 3.4 | ○ | 3.4 | 5.9 | 420 | −16.4 | −5.3 |
| Comparative Example 10 | 1430 | 4.5 | ○ | 2.1 | 12.1 | 450 | −12.3 | −3.4 |
| Comparative Example 11 | 3502 | 5.6 | X | 2.3 | 18.6 | 430 | −13.4 | −10.6 |
| Comparative Example 12 | 1870 | 4.3 | ○ | 5.4 | 5.1 | 450 | −14.5 | −7.8 |
| Comparative Example 13 | 2670 | 6.8 | ○ | 3.4 | 0.8 | 440 | −13.4 | −5.7 |
| Comparative Example 14 | 2348 | 4.5 | X | 6.7 | 15.6 | 434 | −12.3 | −13.4 |
| Comparative Example 15 | 2119 | 7.2 | ○ | 3.4 | 1.2 | 342 | −11.2 | −6.4 |
| Comparative Example 16 | 2092 | 5.6 | X | 0.03 | 1.3 | 432 | −12.3 | −7.3 |

In Tables 6 and 7, it was shown that all characteristics were superior within the range of the compositions of the present invention, and that all of the characteristics were deteriorated outside the range of the compositions of the present invention. The effect of each component will be further explained in detail by referring to the Examples and Comparative Examples.

In Examples 4 to 9, each component satisfied the range of the present invention. With respect to the Examples, the dielectric constant was high at over 2600; the dielectric loss (tan δ) was low; and the temperature characteristic satisfied X7R; the insulation resistance was over 10$^8$Ω; and IR accelerated life, dielectric breakdown voltage, DC bias characteristics, and aging deterioration of capacitance, were superior. In the composition ratio of the Comparative Examples, all of the components deviated from the range of the present invention.

In contrast, in Comparative Examples 5 to 7, the dielectric breakdown voltage was reduced or the insulation resistance deteriorated, since the amount of vanadium oxide (V$_2$O$_5$) was outside the range of the composition, or since amounts of vanadium oxide (V$_2$O$_5$), tantalum oxide (Ta$_2$O$_5$), molybdenum oxide (MoO$_3$), and tungsten oxide (WO$_3$) were outside the range of the composition.

In Comparative Example 8, the dielectric constant was reduced since yttrium oxide (Y$_2$O$_3$) was used instead of dysprosium oxide (Dy$_2$O$_3$). In addition, in Comparative Example 12, the dielectric constant was reduced since dysprosium oxide exceeded 5 mol %. Furthermore, in Comparative Example 9, amounts of barium oxide (BaO) and calcium oxide (CaO) were outside the composition of the present invention. In Comparative Example 9, since total amounts of BaO and CaO exceeded 5 mol %, the dielectric constant was low, and the DC bias characteristics deteriorated in comparison with the Examples 1 to 5 and 9.

In Comparative Examples 11 and 12, the amount of magnesium oxide (MgO) was outside the range of the present invention. In Comparative Example 11, the temperature characteristics did not satisfy X7R since the content of magnesium oxide was under 1 mol which was controlled in the present invention. In addition, in Comparative Example 12, the dielectric constant was low and the accelerated life of IR was short since the content of magnesium oxide exceeded 3 mol % which was controlled in the present invention.

In Comparative Examples 13 and 14, the addition amount of manganese oxide (MnO) was outside the range of the present invention. In Comparative Example 13, the accelerated life of IR was reduced since the addition amount of manganese oxide was under 0.1 mol % which was controlled in the present invention. In addition, in Comparative Example 14, the aging deterioration of capacitance increased since the addition amount of manganese oxide exceeded 1 mol % which was controlled in the present invention.

In Comparative Examples 15 and 16, the addition amount of silicon oxide ($SiO_2$) was outside the range of the present invention. In Comparative Example 15, the dielectric breakdown voltage was reduced and the dielectric constant was also low since the addition amount of silicon oxide was under 1 mol % which was controlled in the present invention. In contrast, in Comparative Example 16, the insulation resistance was reduced and the dielectric constant was also low since addition amount of silicon oxide exceeded 5 mol % which was controlled in the present invention.

What is claimed is:

1. A dielectric ceramic composition comprising barium titanate, as a main component and comprising magnesium oxide, dysprosium oxide, barium oxide, calcium oxide, vanadium oxide, silicon oxide, manganese oxide, and molybdenite oxide as subcomponents, wherein magnesium oxide converted into MgO is 1 to 3 mol, dysprosium oxide converted into $Dy_2O_3$ is 1 to 5 mol, total of barium oxide and calcium oxide converted into BaO and CaO, respectively, is 0.1 to 5 mol, and vanadium oxide converted into $V_2O_5$ is 0.01 to 0.1 mol, silicon oxide converted into $SiO_2$ is 1 to 5 mol, manganese oxide converted into MnO is 0.1 to 1 mol, and molybdenite oxide converted into $MoO_3$ is 0.05 to 0.2 mol, when barium titanate converted into $BaTiO_3$ is 100 mol.

2. A dielectric ceramic composition comprising barium titanate, as a main component and comprising magnesium oxide, dysprosium oxide, barium oxide, calcium oxide, vanadium oxide, tantalum oxide, silicon oxide and manganese oxide as subcomponents, wherein magnesium oxide converted into MgO is 1 to 3 mol, dysprosium oxide converted into $Dy_2O_3$ is 1 to 5 mol, total of barium oxide and calcium oxide converted into BaO and CaO, respectively, is 0.1 to 5 mol, vanadium oxide converted into $V_2O_5$ is 0.01 to 0.1 mol, tantalum oxide converted into $Ta_2O_5$ is 0.01 to mol, silicon oxide converted into $SiO_2$ is 1 to 5 mol, and manganese oxide converted into MnO is 0.1 to 1 mol, when barium titanate converted into BaTiO3 is 100 mol.

3. A dielectric ceramic composition comprising barium titanate, as a main component and comprising magnesium oxide, dysprosium oxide, barium oxide, calcium oxide, vanadium oxide, tungsten oxide, silicon oxide and manganese oxide as subcomponents, wherein magnesium oxide converted into MgO is 1 to 3 mol, dysprosium oxide converted into $Dy_2O_3$ is 1 to 5 mol, total of barium oxide and calcium oxide converted into BaO and CaO, respectively, is 0.1 to 5 mol, vanadium oxide converted into $V_2O_5$ is 0.01 to 0.1 mol, tungsten oxide converted into $WO_3$ is 0.01 to 1 mol, silicon oxide converted into $SiO_2$ is 1 to 5 mol, and manganese oxide converted into MnO is 0.1 to 1 mol, when barium titanate converted into $BaTiO_3$ is 100 mol.

4. A dielectric ceramic composition comprising barium titanate, as a main component and comprising magnesium oxide, dysprosium oxide, barium oxide, calcium oxide, vanadium oxide, silicon oxide, manganese oxide, and at least one of tantalum oxide and tungsten oxide as subcomponents, wherein silicon oxide converted into $SiO_2$ is 1 to 5 mol, manganese oxide converted into MnO is 0.1 to 1 mol, and at least one of tantalum oxide and tungsten oxide converted into $Ta_2O_5$ and $WO_3$, respectively, is 0.01 mol or more and 1 mol or less, when barium titanate converted into $BaTiO_3$ is 100 mol.

5. A dielectric ceramic composition comprising barium titanate as a main component, and comprising magnesium oxide, dysprosium oxide, barium oxide, calcium oxide, vanadium oxide, silicon oxide, manganese oxide, and at least one of tantalum oxide, tungsten oxide, and molybdenite oxide, as subcomponents, wherein magnesium oxide converted into MgO is 1 to 3 mol, dysprosium oxide converted into $Dy_2O_3$ is 1 to 5 mol, total of barium oxide and calcium oxide converted into BaO and CaO, respectively, is 0.1 to 5 mol, vanadium oxide converted into $V_2O_5$ is 0.01 to 0.1 mol, silicon oxide converted into $SiO_2$ is 1 to 5 mol, manganese oxide converted into MnO is 0.1 to 1 mol, and total of tantalum oxide, tungsten oxide, and melybdenite oxide converted into $Ta_2O_5$, $WO_3$, and $MoO_3$, respectively, is 0.01 mol or more and 1 mol or less, when barium titanate converted into $BaTiO_3$ is 100 mol.

6. A multilayer ceramic capacitor made of the dielectric ceramic composition according to one of claims 1 to 4 and 5.

7. A multilayer ceramic capacitor according to claim 6, wherein an internal electrode is made of nickel.

* * * * *